May 18, 1937.  C. R. ROGERS  2,080,744

TRACK ROLLER CONSTRUCTION

Filed July 5, 1935  2 Sheets-Sheet 1

Inventor
Clifford R. Rogers

May 18, 1937. C. R. ROGERS 2,080,744
TRACK ROLLER CONSTRUCTION
Filed July 5, 1935 2 Sheets-Sheet 2
Fig. 3.
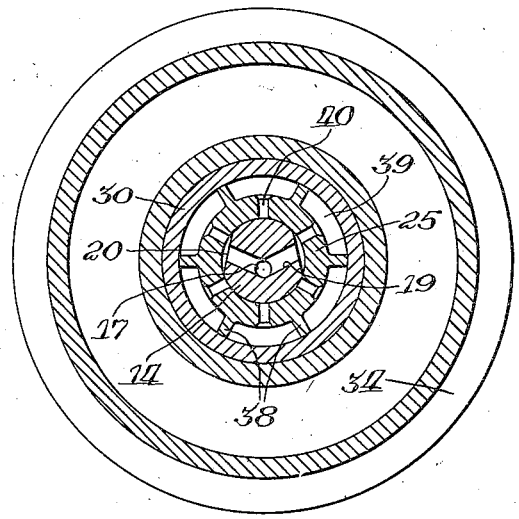
Fig. 4.
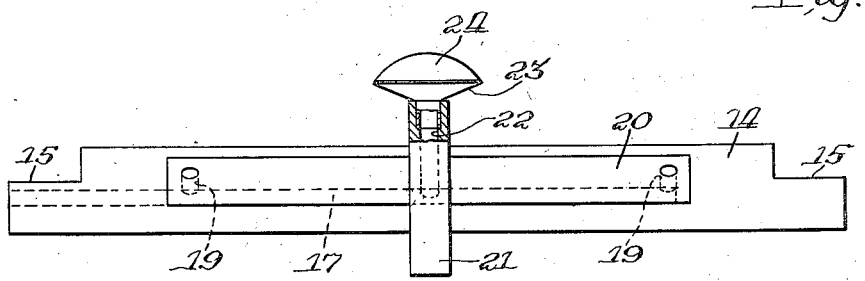
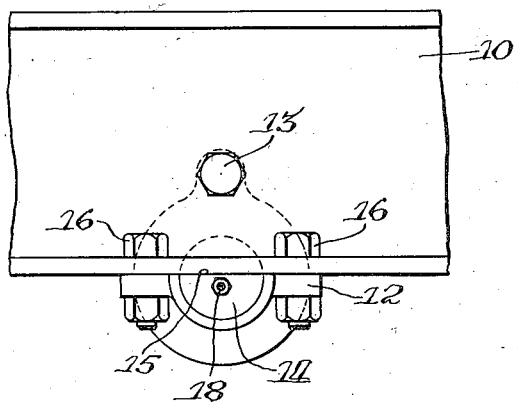
Fig. 5.
Inventor
Clifford R. Rogers
By V. F. Lavaque
Atty.

Patented May 18, 1937

2,080,744

UNITED STATES PATENT OFFICE 2,080,744

TRACK ROLLER CONSTRUCTION

Clifford R. Rogers, Oak Park, Ill., assignor to International Harvester Company, a corporation of New Jersey Application July 5, 1935, Serial No. 29,934

8 Claims. (Cl. 74—230.1)

The invention relates to an improved construction of track rollers for use in connection with the traction devices of track type tractors.

These track rollers are usually mounted in side frames and serve to transmit the load of the tractor to the ground run of the endless track belts. As these rollers are thus subjected to severe loads, it is important that they be sturdily constructed so as to withstand these loads. It is also important that they be designed to facilitate manufacture and assembly thereof, and that the bearing surfaces be ample to take the loads and prevent wear. It is also important that the bearing surfaces be properly lubricated both at slow speed turning and high speed turning of the rollers.

The main object of the invention, therefore, is to provide an improved track roller construction for the purposes stated.

Another object is to provide an improved construction of track roller embodying improvements that will facilitate manufacture and assembly.

Another object is to provide improved bearings for the roller in combination with means for properly lubricating the same.

Other objects will be apparent to those skilled in this art as the disclosure is more fully made.

These objects may be achieved by the practicable form of the invention herein illustrated and described and in which form the side truck frame of a crawler tractor carries brackets for mounting a stationary shaft, which between its end is upset to form an intermediate thrust flange. An inner carrier bearing sleeve is slid on to each end of the shaft to abut the thrust flange, said carrier bearing sleeves carrying another or outer sleeve, which is enlarged radially outwardly intermediate its ends to form an oil reservoir, said last mentioned sleeve being continuous and spanning the two first mentioned sleeves by means of a tight friction fit. Each end of the last mentioned sleeve carries a roller, which rollers at their outer faces carry snap rings that cooperate with ribs on the first two mentioned bearing sleeves to hold said rollers against any possible endwise movement on the outer sleeve. The stationary shaft is provided with a coaxial bore having radial passages for leading lubricant to opposite flattened surfaces formed on said shaft. The two inner carrier sleeves further are provided with cavities communicating with holes in said two carriers to lead lubricant from the enlarged reservoir to the bearing surface between the shaft and the two inner carrier sleeves. Further, the upset portion of the shaft carries a stationary oil catching element for distributing oil through a bore in the upset portion to the coaxial bore in the shaft, said oil, when the rollers turn at high speed, being pumped under pressure to the bearing surfaces.

In the accompanying drawings illustrating the invention,

Figure 3 is a similar vertical, sectional view taken along the line 3—3 of Figure 1, looking in the direction of the arrows;

Figure 4 is a detail side elevational view of the stationary shaft which carries the track roller assembly; and, Figure 5 is an end view looking at one side of the track roller frame, showing the manner of mounting the ends of said stationary shaft in the truck frame.

Figure 1:
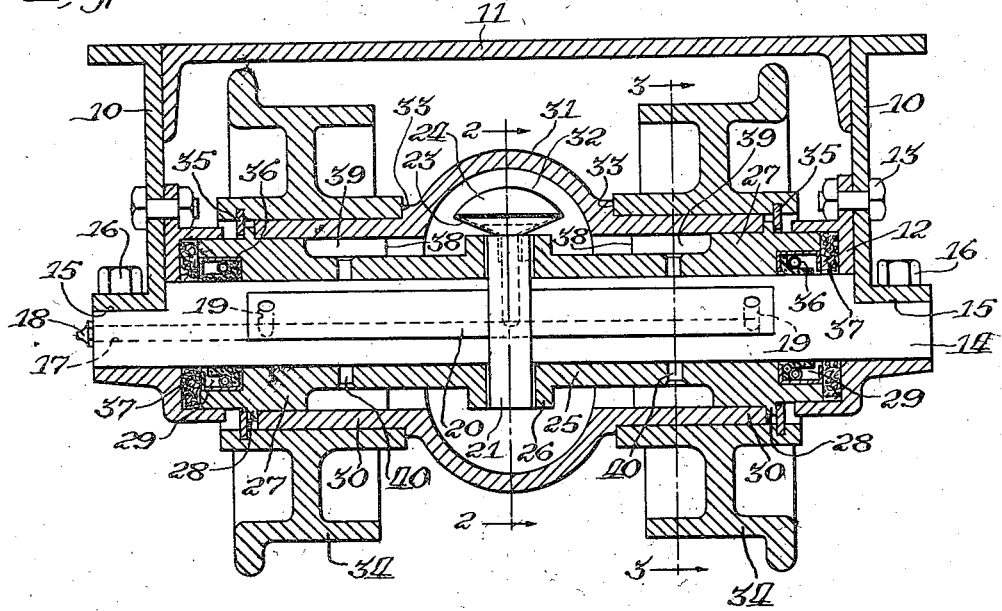
Figure 1 is a central, vertical sectional view through a track roller frame, showing one of the improved track roller assemblies mounted therein.
Figure 2:
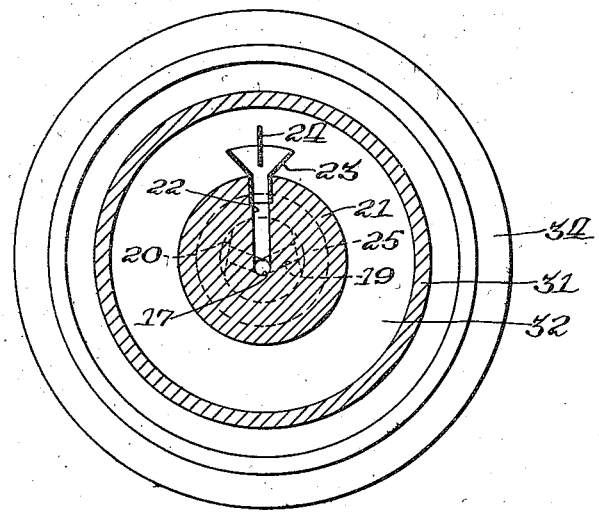
Figure 2 is a vertical cross sectional view through the track roller structure taken along the line 2—2 of Figure 1, looking in the direction of the arrows.

The track type tractor side truck frame comprises spaced side channel frame members 10 between which is connected a top plate 11. The side frames 10 carry transversely aligned brackets 12 at their inner faces by means of a bolt 13, which brackets carry the stationary transverse shaft 14, the ends of which are reduced and made flat, as at 15. The lower flange of the channel side pieces 10 fits flatly on these flattened ends of the shaft, so that the shaft cannot turn, there being bolts 16 for securing the lower portion of the bracket 12 to the lower flange of the side frames 10, as shown in Figures 1 and 5.

It will now be understood that the shaft 14 is locked by the structure just described in the side frames 10, against rotation. This shaft 14 is cylindrical and is provided with a coaxial bore 17 in communication with a nipple 18 at one side of one of the frames 10, so that lubricant may be forced through the shaft 14. Radial bores 19 extend from the bore 17 to distribute the oil to oppositely arranged flat surfaces 20 formed on the shaft.

The intermediate portion of the shaft is formed with an upset flange 21, which flange has a vertical, radial bore 22 in communication with the coaxial bore 17, said bore 22 having fitted thereinto a funnel or scoop member 23 including a transverse wall or partition member 24.

Slid onto the opposite ends of the shaft 14 is a pair of inner bearing carrier sleeves 25, the inner ends of which are provided with a thrust flange 26 adapted to abut the upset flange 21 on the shaft 14. The outer ends of each sleeve 25 are formed with a shoulder 27 of the same diameter as the flange 26, which shoulders carry an annular rib 28, and said sleeves 25 further having their outer ends provided with a recess 29, as shown.

An outer sleeve 30 is tightly shrunk and friction fitted on the shoulders 27 of the two sleeves 25, said sleeve 30 being continuous to span both sleeves 25 and having its intermediate portion enlarged outwardly, as at 31, to provide an annular oil reservoir 32 disposed around the upset 21 intermediate the ends of the shaft 14.

Opposite sides of the bulged annular portion 31 terminate in shoulders 33, against which are press-fitted track rollers 34, said rollers having a tight friction fit with the respective ends of the sleeve 30. Each roller 34 carries in the outer end of its hub portion a spring snap ring 35, which is adapted to lock over the annular ribs 28 heretofore described, so that in effect each roller 34 is locked between the shoulder 33 and the rib 28 on the sleeve 30. The recessed ends 29 of each carrier 25 carry a dirt and oil seal 36, and between the outer ends of the sleeves 25 and the bracket 12 is arranged a felt washer 37 further to prevent ingress of dirt to the bearing surface between the sleeves 25 and the shaft 14 and also to prevent oil leakage.

As shown in Figures 1 and 3, the reduced outer surface of the sleeves 25 between their flanges 26 and shoulders 27 are formed with radial ribs 38 to provide segmental cavities 39 which are open at their inner ends facing the annular reservoir 32. From each cavity 39 there is led a radial bore 40 formed through the sleeves 25 and leading to the bearing surface between the inner surface of the sleeves 25 and the outer surface of the shaft 14.

The arrangement thus provides a very sturdy track roller construction which can be easily assembled and which is convenient to manufacture. When the track rollers 34 turn slowly with the sleeve 30 and the sleeves 25, the lubricant is trapped in the cavities 39 and is elevated upwardly to the top side of the shaft 14, each cavity 39 then in turn draining its oil by gravity flow through its bore 40 to lead the oil to the bearing surface on the shaft 14. At high speed turning of the rollers the oil is trapped by centrifugal force in the outer periphery of the reservoir 32, which is the inner surface of the bulged part 31, said oil hitting the partition 24 to drain down the funnel 23, bore 22, and into the passage 17 from whence the oil issues through the bores 19 to the flat surface 20 on the shaft, the flat surface serving to spread oil along the length of the shaft 14 in an obvious manner and in the manner disclosed in a copending application filed by the present applicant jointly with David B. Baker, said application bearing Serial No. 739,014, filed August 8, 1934, for Track roller assembly. The present application constitutes an improvement over the aforementioned application mainly in the structural form of the track roller assembly.

It is to be understood that a sufficient quantity of lubricant will be forced into the interior of the assembly through the nipple 18 to make the distribution of lubricant at slow speed and high speed turning of the rollers function in the manner described.

From this disclosure it will now be appreciated that an improved track roller assembly has been provided which achieves the desirable objects heretofore recited.

It is the intention to cover all such changes and modifications of the practicable example chosen for the purposes of this disclosure which do not depart from the spirit and scope of the invention as covered by the appended claims.

What is claimed is:

1. A track roller assembly comprising a stationary horizontal shaft, said shaft formed with a thrust flange substantially midway between its ends, a pair of inner cylindrical sleeves respectively turnable on the opposite ends of the shaft with the thrust flange disposed between adjacent inner ends of the sleeves, an outer cylindrical sleeve spanning both inner sleeves and closely fitted thereon to turn therewith, said outer sleeve having an enlarged portion between its ends surrounding the thrust flange, and a track roller having a cylindrical hub frictionally fitted on each end of the outer sleeve on opposite sides of its enlarged portion to turn with the outer sleeve, said hubs of the rollers at their inner ends thrusting against a shoulder respectively formed on each side of the enlarged portion.

2. In a track roller assembly including spaced frame members carrying brackets for mounting a stationary shaft with said shaft having a thrust flange formed substantially midway between its ends, the combination therewith of a bearing comprising a pair of inner cylindrical sleeves respectively turnable on the opposite ends of the shaft with the thrust flange disposed between adjacent inner ends of the sleeves, the outer ends of the sleeves being hollowed for carrying sealing means between the outer ends of the sleeves and the brackets, an outer cylindrical sleeve spanning both inner sleeves and closely fitted thereon to turn therewith, said outer sleeve having an enlarged oil reservoir portion midway between its ends surrounding the thrust flange, track rollers having cylindrical hubs frictionally fitted respectively on each end of the outer sleeve on opposite sides of its enlarged portion to turn with the outer sleeve, said shaft and flange being formed with bores adapted to distribute oil from the reservoir to the bearing surface of the shaft and inner sleeves.

3. In a track roller assembly including spaced frame members carrying brackets for mounting a stationary shaft, said shaft formed with a thrust flange substantially midway between its ends, the combination therewith of a bearing comprising a pair of inner cylindrical sleeves respectively turnable on the opposite ends of the shaft with the thrust flange disposed between adjacent inner ends of the sleeves, an outer cylindrical sleeve spanning both inner sleeves and closely fitted thereon to turn therewith, said outer sleeve having an enlarged oil reservoir portion midway between its ends surrounding the thrust flange, track rollers having cylindrical hubs and respectively fitted on each end of the outer sleeve on opposite sides of its enlarged portion to turn with the outer sleeve, means to hold said rollers against endwise movement on the outer sleeve, said shaft and flange being formed with bores adapted to distribute oil from the reservoir to the bearing surface of the shaft and inner sleeves.

4. In a track roller assembly including spaced frame members carrying brackets for mounting a stationary shaft, said shaft formed with a thrust flange substantially midway between its ends, in combination therewith of a bearing comprising a pair of inner cylindrical sleeves respectively turnable on the opposite ends of the shaft with the thrust flange disposed between adjacent inner ends of the sleeves, the outer ends of the sleeves being hollow and carrying sealing means between the outer ends of the sleeves and the brackets, an outer cylindrical sleeve spanning both inner sleeves and fitted frictionally thereon to turn therewith, said outer sleeve having an enlarged oil reservoir portion midway between its ends surrounding the thrust flange, track rollers having cylindrical hubs respectively fitted on each end of the outer sleeve on opposite sides of its enlarged portion to turn with the outer sleeve, means to hold said rollers against endwise movement on the outer sleeve, said shaft and flange being formed with bores adapted to distribute oil from the reservoir to the bearing surface of the shaft and inner sleeves.

5. In a track roller assembly including a frame carrying a horizontal shaft fixed against rotation, said shaft formed with a radial thrust flange intermediate its ends, the combination therewith of a bearing comprising an inner cylindrical sleeve turnable on each end of the shaft, the inner ends of the sleeves having a radial flange to abut the thrust flange at opposite sides thereof, the outer ends of said sleeves carrying a radial rib, an outer cylindrical sleeve press-fitted over the aforementioned two inner sleeves in close contact therewith and spanning the same and enlarged midway between its ends with the enlargement surrounding the thrust flange on the shaft, said outer sleeve adjacent the opposite sides of the enlarged portion being formed with a shoulder, the outer ends of the outer sleeve abutting the rib on the outer end of the inner sleeves, track rollers having cylindrical hubs respectively tightly fitted on each outer end of the outer sleeve with the hubs at their inner ends abutting respectively the shoulders mentioned, and a snap ring respectively carried in the hubs of said rollers at their outer ends to abut respectively against the outer faces of the ribs mentioned.

6. In a track roller assembly including a frame carrying a horizontal shaft fixed against rotation, said shaft formed with a thrust flange intermediate its ends, the combination therewith of a bearing comprising an inner cylindrical sleeve turnable on each end of the shaft, the inner ends of the sleeves having radial flanges to abut the thrust flange, the outer ends of said sleeves carrying radial ribs and having their said outer ends axially recessed, a seal in each recess around the shaft, an outer cylindrical sleeve press-fitted over the aforementioned two inner sleeves and spanning the same and enlarged midway between its ends with the enlargement surrounding the thrust flange on the shaft, said outer sleeve adjacent the opposite sides of the enlarged portion being formed with a shoulder, the outer ends of the outer sleeve abutting the respective ribs on the outer ends of the inner sleeves, a track roller tightly fitted on each outer end of the outer sleeve and each roller having a cylindrical hub which at its inner end abuts the shoulder mentioned, and means carried respectively at the outer ends of the hubs of said rollers adapted to abut against the outer face of the respective ribs mentioned.

7. In a track roller assembly including a frame carrying a shaft fixed against rotation, said shaft formed with a thrust flange intermediate its ends, the combination therewith of a bearing comprising an inner cylindrical sleeve turnable on each end of the shaft, the inner ends of the sleeves having radial flanges to abut the thrust flange, an outer cylindrical sleeve press-fitted over the aforementioned two inner sleeves and spanning the same and enlarged midway between its ends, the enlargement surrounding the thrust flange on the shaft, said outer sleeve adjacent the opposite sides of the enlarged portion being formed with shoulders, a track roller tightly fitted on each outer end of the outer sleeve and each roller having a cylindrical hub which at its inner end abuts the shoulder mentioned, and means operatively associated with the outer ends of the hubs of said rollers to lock the same against endwise displacement.

8. In a track roller assembly including a frame carrying a horizontal shaft fixed against rotation, said shaft formed with a thrust flange intermediate its ends, the combination therewith comprising a bearing including an inner cylindrical sleeve turnable on each end of the shaft, the inner ends of the sleeves having radial flanges to abut the thrust flange, the outer ends of said sleeves carrying radial ribs and having their said outer ends axially recessed, a seal in each recess around the shaft, an outer cylindrical sleeve press-fitted over the aforementioned two inner sleeves and spanning the same and enlarged midway between its ends to form an oil reservoir surrounding the thrust flange on the shaft, said outer sleeve adjacent the opposite sides of the enlarged portion being formed with shoulders, the outer ends of the outer sleeve abutting the ribs on the outer end of the inner sleeves, a track roller tightly fitted on each outer end of the outer sleeve and each roller having a hub which at its inner end abuts a shoulder mentioned, and a snap ring respectively carried by the hubs of the rollers at their outer ends which rings respectively lock against the outer face of the ribs mentioned, said shaft and inner sleeves being formed with means to distribute lubricant to the bearing surface between the shaft and inner sleeves.

CLIFFORD R. ROGERS.